United States Patent
Bohannon

(10) Patent No.: US 10,026,535 B2
(45) Date of Patent: Jul. 17, 2018

(54) MECHANICAL MAGNETIC CONNECTOR STRUCTURE

(71) Applicant: Jeremiah Bohannon, Bend, OR (US)

(72) Inventor: Jeremiah Bohannon, Bend, OR (US)

(73) Assignee: CATCH LATCH, LLC, Bend, OR (US)

( * ) Notice: Subject to any disclaimer, the term of this patent is extended or adjusted under 35 U.S.C. 154(b) by 45 days.

(21) Appl. No.: 14/986,307

(22) Filed: Dec. 31, 2015

(65) Prior Publication Data

US 2017/0194083 A1    Jul. 6, 2017

(51) Int. Cl.
*H01F 7/02* (2006.01)

(52) U.S. Cl.
CPC .................................. *H01F 7/0205* (2013.01)

(58) Field of Classification Search
CPC ...... H01F 7/0278; H01F 7/0284; H01F 7/021; F16C 39/063; G01R 33/3833
See application file for complete search history.

(56) References Cited

U.S. PATENT DOCUMENTS

| | | | |
|---|---|---|---|
| 5,920,966 A * | 7/1999 | Chen | A41F 1/002 24/303 |
| 6,964,361 B2 | 11/2005 | Kathrein | |
| 8,495,803 B2 | 7/2013 | Fiedler | |
| 2008/0141502 A1* | 6/2008 | Khubani | A44C 5/185 24/303 |
| 2010/0263173 A1* | 10/2010 | Clarke | A41F 1/002 24/303 |
| 2010/0287741 A1* | 11/2010 | Fiedler | A44B 99/00 24/303 |

FOREIGN PATENT DOCUMENTS

| | | |
|---|---|---|
| EP | 1358970 A1 | 11/2003 |
| GB | 2511104 A | 8/2014 |
| JP | H07224846 A | 8/1995 |
| WO | 2012136036 A1 | 10/2012 |

* cited by examiner

*Primary Examiner* — Bernard Rojas
(74) *Attorney, Agent, or Firm* — Charter IP LLC; Matthew J. Lattig

(57) ABSTRACT

A mechanical-magnetic connector structure for releasably connecting a first element with a second element is herein described. The connector structure includes a dongle attached to the first element, a receiver assembly attached to the second element and having a bore, and a rotating knob assembly attached to the receiver assembly and rotatable between an open and closed position to unlock or lock the dongle within the bore. With the rotating knob assembly rotated to the closed position, the dongle no longer is completely concentric within the bore, such that a user is prevented from applying any offset, angled, or indirect pull force on the dongle in an effort to remove it. The dongle can only be removed if completely concentric within the bore and the rotating knob assembly has been rotated to the open position.

23 Claims, 14 Drawing Sheets

MECHANICAL MAGNETIC CONNECTOR STRUCTURE

BACKGROUND

Field

The example embodiments in general are directed to a mechanical-magnetic connector structure, more particularly to a connector structure for releasably connecting a first element with a second element.

Related Art

FIG. 1 shows a perspective view of a prior art mechanical-magnetic connecting structure; FIG. 2 shows another perspective view of the connecting structure according to FIG. 1; FIG. 3 shows a sectional drawing of the connecting structure according to FIG. 1; and FIG. 4 shows a plan view of the connecting structure according to FIG. 1. Referring to FIGS. 1-4, there is shown a conventional mechanical-magnetic connecting structure 1. The structure 1 includes a module A (51) which is firmly connected with a first element or is rotatably arranged in the first element, and a module B (52) which is firmly connected with the second element or is rotatably arranged in the second element. Module A 51 is rotatably guided in module B 52. In module A 51, at least one magnet (see 4a/b) is arranged and in module B 52 at least one armature or second magnet (see 8a/b) is arranged.

The shape, position and polarity of the magnets 4a/b, 8a/b are designed so that when rotating module A 51 relative to module B 52, the magnets 4a/b, 8a/b can move from a closed position with maximum magnetic attraction into an open position with weakened magnetic attraction. Also, a positive lock is provided, which exists between two engagement portions 5/5' and 9a/9a' at module A 51 and module B 52, i.e. when the modules are attracted to each other by the magnetic force, the two engagement portions 5/5' and 9a/9a' become operatively connected and lock each other.

The engagement portion(s) 9a/9a'/9a" arranged on a spring locking element 9 on module B 52 is of the helical type and the matching engagement portion 5'/5' on module A 51 likewise is of the helical type. Module A 51 and module B 52 close without rotation such that the helical engagement portion positively snaps into place with the helical engagement portion by means of the magnetic attraction. Module A and module B can be opened such that when rotating the modules and correspondingly rotating the magnets 4a/b, 8a/b from the closed position into the open position, the helical engagement portions are screwed out of engagement.

SUMMARY

An example embodiment of the present invention is directed to a mechanical-magnetic connector structure for releasably connecting a first element with a second element. The connector structure includes a first module attached to the first element, and a second module attached to the second element, with the second module adapted to receive the first module therein. The first module includes a first magnet and the second module includes a second magnet. The first magnet is exposed in a plug-shaped portion of the first module, the plug-shaped portion having a smooth external surface with no physical retainer element formed thereon. The second magnet is exposed on a rear interior facing wall surface within a bore of the second module. The bore has smooth side wall portions along the longitudinal axis of the second module for receiving the first module therein, the smooth side wall portions having no physical retainer element thereon that would prevent movement of the first module in the longitudinal axis relative to the second module. The first and second magnets come into proximal facing relation with maximum magnetic attraction as the plug-shaped portion is magnetically sucked into the bore of the second module. Only the magnetic attraction between the magnets and friction between the smooth side wall portions and the smooth external surface of the plug-shaped portion serve to secure the first module within the second module.

Another example embodiment is directed to a mechanical-magnetic connector structure for releasably connecting a first element with a second element. The connector structure includes a dongle attached to the first element, a receiver assembly attached to the second element and having a bore for receiving the dongle therein, and a rotating knob assembly attached to the receiver assembly and rotatable between an open and closed position to unlock or lock the dongle within the bore. With the rotating knob assembly rotated to the closed position, the dongle no longer is completely concentric within the bore, such that a user is prevented from applying any offset, angled, or indirect pull force on the dongle in an effort to remove it from the bore, the dongle being removable out of the bore only if the dongle is completely concentric within the bore and the rotating knob assembly has been rotated to the open position, permitting a user to overcome pull forces between the magnets as the dongle is removed directly straight out of the bore.

Another example embodiment is directed to a mechanical mechanical-magnetic connector structure for releasably connecting a first element with a second element, the connector structure including an elongate first module attached to the first element, the first module having a smooth external surface with no physical retainer element formed thereon and including a first magnet thereon, and a hollow second module attached to the second element and adapted to receive the first module within a bore thereof. The bore further includes smooth side wall portions along the longitudinal axis of the second module, the smooth side wall portions having no physical retainer element thereon that would prevent movement of the first module in the longitudinal axis within the bore relative to the second module. The second module further includes a second magnet within the bore, the first module freely rotatable within the bore. The first and second magnets are brought into proximal facing relation as the first module is magnetically sucked into the bore, wherein each of the first and second magnets exhibits a pull force of less than five (5) pounds.

Another example embodiment is directed to a mechanical-magnetic connector structure for releasably connecting a first element with a second element, the connector structure including an elongate first module attached to the first element, the first module including a first magnet and having a partially curved external surface terminating in a circular ridged end that is adapted to be inserted into the bore, and a hollow second module attached to the second element and adapted to receive the first module within a bore thereof, the second module including a front ledge wall and a second magnet within the bore, the first and second magnets being brought into proximal facing relation as the first module is inserted into the bore. The connector structure further includes a collar attached to the second module, a circumferential channel formed between the front ledge wall and the collar, and a dynamic lock mechanism which permits articulating movement of the first module within the second module while remaining locked and secured therein and with the first module attached to a weighted first element. The dynamic lock mechanism is further comprised of the curved external surface and circular ridged end of the first module, and the circumferential channel. The curved external surface is adapted to serve as a rocker to provide forgiveness or a flex action as the first module is inserted through the collar into the bore, such that the circular ridged end is adapted to move, rock, or cant while being retained within the circumferential channel, thereby preventing the first module from inadvertently popping out of the bore due to a weight or pull force applied to the first element attached thereto.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

Figure 1:
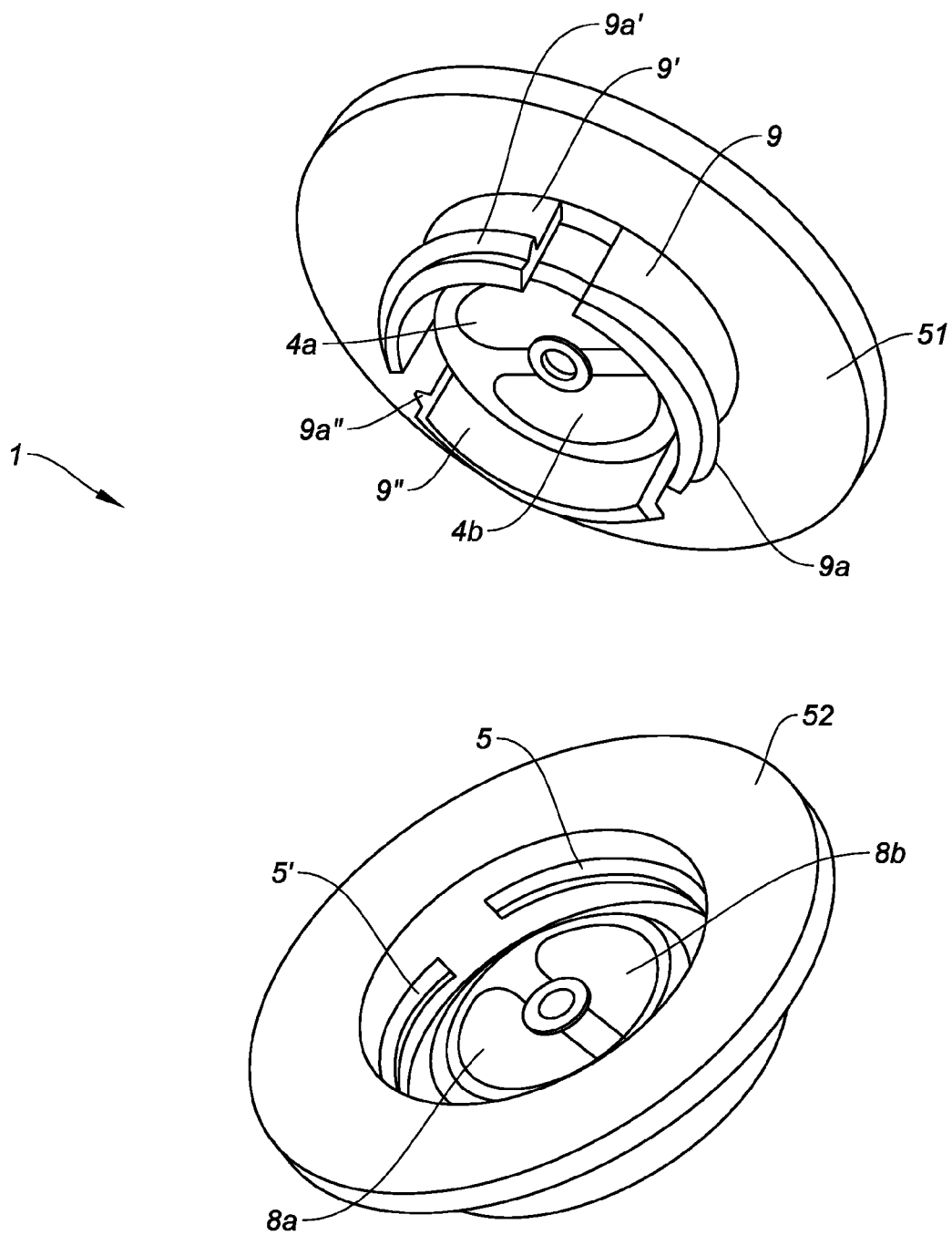
FIG. 1 shows a perspective view of a prior art mechanical-magnetic connecting structure.
Figure 2:
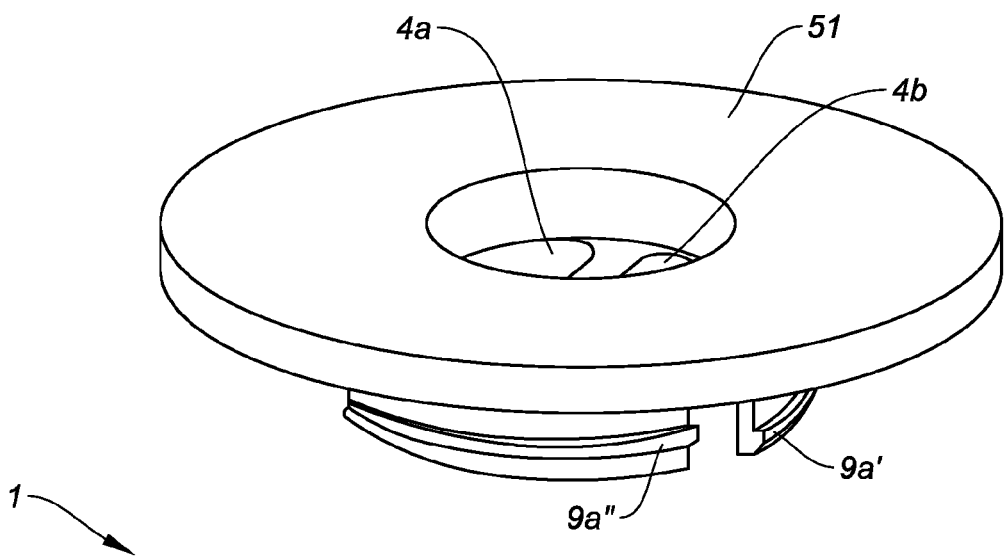
FIG. 2 shows another perspective view of the prior art connecting structure according to FIG. 1.
Figure 2:
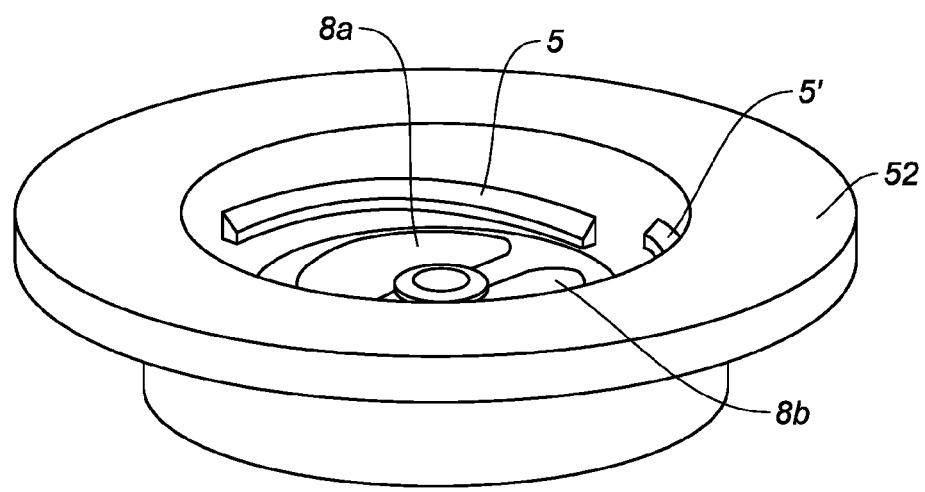
Figure 3:
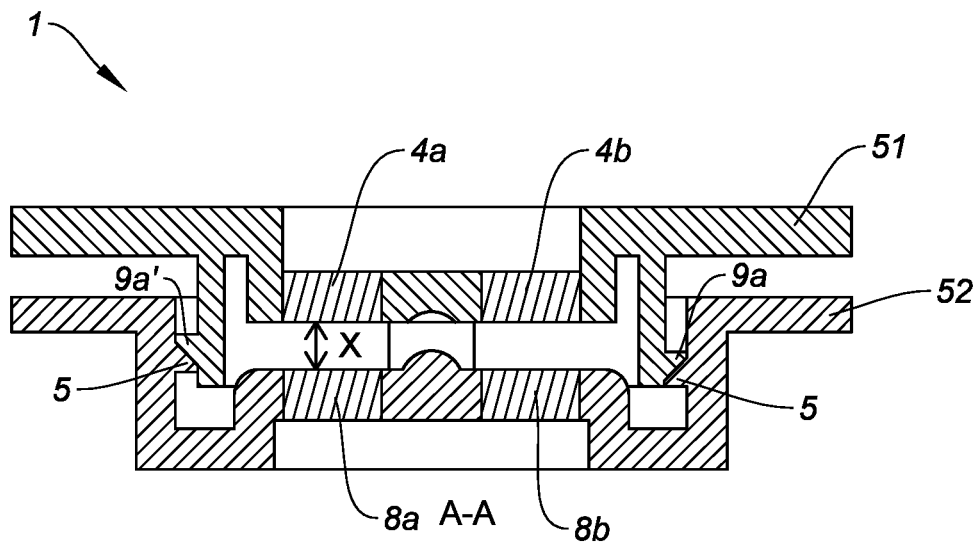
FIG. 3 shows a sectional drawing of the connecting structure according to FIG. 1.
Figure 4:
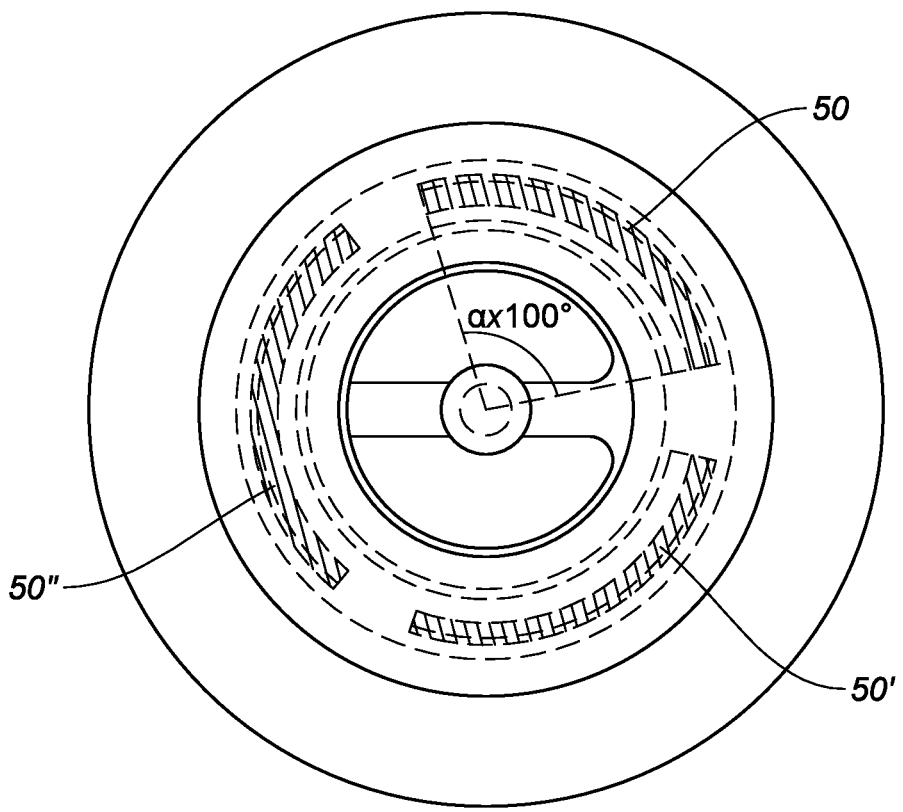
FIG. 4 shows a plan view of the connecting structure according to FIG. 1.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

Figure 5:
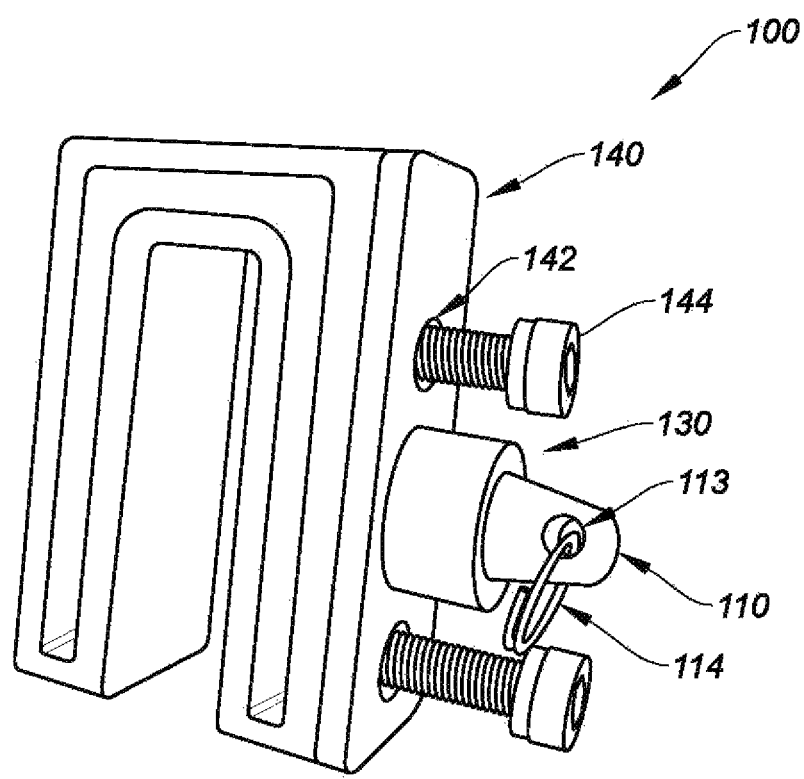
FIG. 5 is a perspective view of a mechanical-magnetic connecting structure according to an example embodiment.
Figure 6:
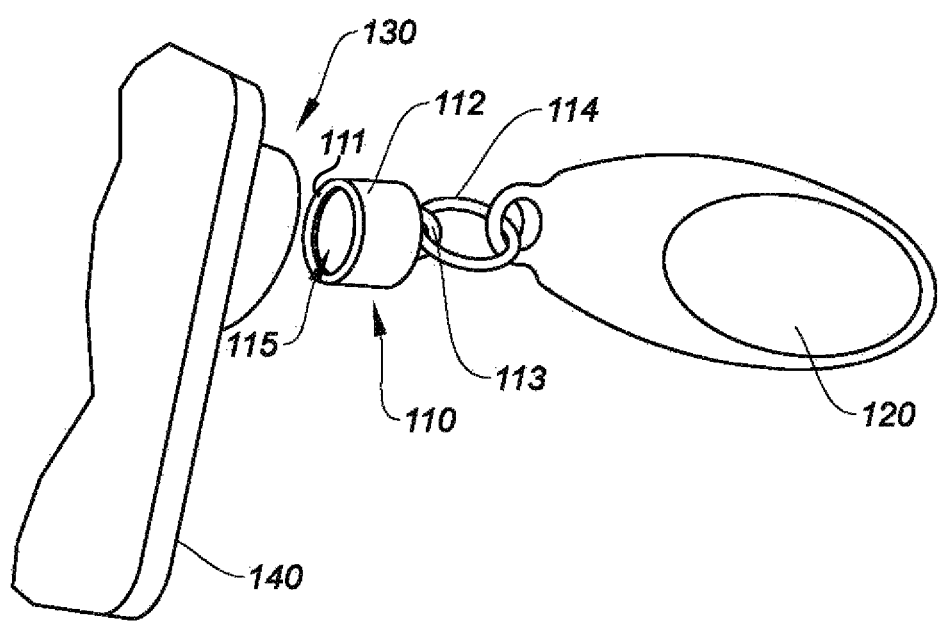
FIG. 6 is a side view of the structure in FIG. 5 to illustrate a first module with first magnet that is attached to a first element.
Figure 7:
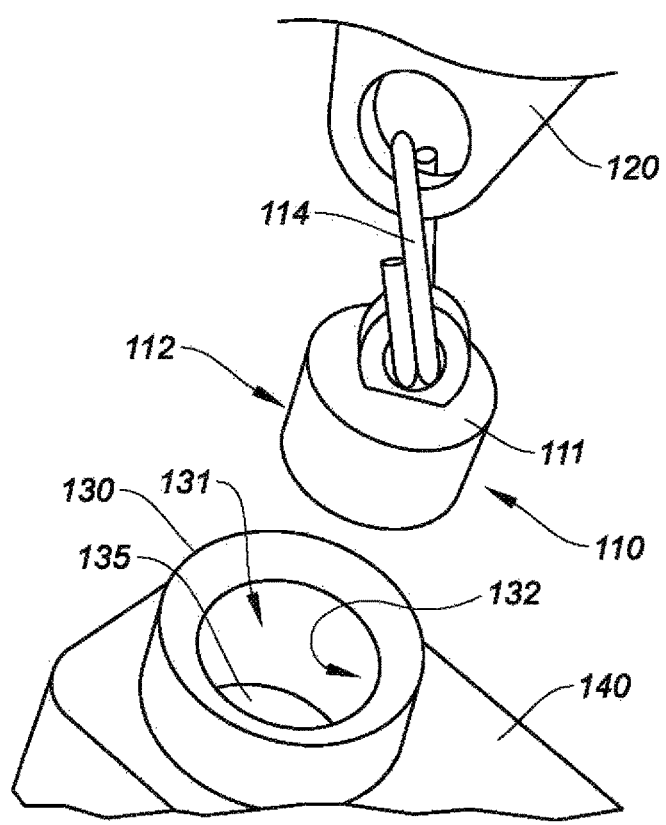
FIG. 7 is a top view of part of the structure in FIG. 5 to illustrate a second module with second magnet that is attached to a second element.

The example embodiments hereafter describe a mechanical-magnetic connector structure for releasably connecting a first element with a second element. FIG. 5 is a perspective view of a mechanical-magnetic connecting structure according to an example embodiment; FIG. 6 is a side view of the structure in FIG. 5 to illustrate a first module with first magnet that is attached to a first element; FIG. 7 a top view of part of the structure in FIG. 5 to illustrate a second module with second magnet that is attached to a second element; and FIG. 8 a cross-sectional view of the connector structure in FIG. 5 to further illustrate connective relationship between the first and second modules so as to releasably connect the first element with the second element. Referring to FIGS. 5 to 8 and in general, there is shown a mechanical-magnetic connector structure 100 for releasably connecting a first element 120 with a second element 140. The connector structure 100 may include a first module (dongle 110) attached to the first element 120, and a second module (a receiver assembly 130) attached to the second element 140. The receiver assembly 130 is adapted to receive a plug-shaped portion of the dongle 110 therein. Dongle 110 may include an aperture 113 capturing a retaining ring 114 for attaching the dongle 110 to the first element 120.

In an example, each of the dongle 110 and one or more components making up the receiver assembly 130 may be formed by an injection molding process from a high impact plastic, such as Acrylonitrile Butadiene Styrene (ABS) or a thermoplastic elastomer (TPE) for example. TPE, sometimes referred to as thermoplastic rubbers, are a class of copolymers or a physical mix of polymers (usually a plastic and a rubber) which consist of materials with both thermoplastic and elastomeric properties. While most elastomers are thermosets, thermoplastics are in contrast relatively easy to use in manufacturing, for example, by injection molding. TPEs show advantages typical of both rubbery materials and plastic materials.

ABS is an easily machined, tough, low cost rigid thermoplastic material with high impact strength, and may be a desirable material for turning, drilling, milling, sawing, die-cutting, shearing, etc. Virgin ABS may be mixed with a plastic regrind of ABS or another lightweight, durable plastic material. ABS is merely an example material, equivalent materials may include various thermoplastic and thermoset materials, such as talc-filled polypropylene, high strength polycarbonates such as GE Lexan®, or blended plastics.

There are many known injection molding machines for forming plastic injection molds, other plastic molding processes such as vacuum forming may be used. Alternatively, each of the dongle 110 and one or more components making up the receiver assembly 130 may be formed using a metal casting process such as sand casting, die casting, or investment casting, for example.

In the example of FIGS. 5-8, the first element 120 may be embodied as a golf accessory and the second element 140 may be embodies as a clip for attachment to a golf bag. However, the example embodiments are not so limited, as the first element 120 may alternatively be an electronic device and the second element 140 may be embodied as any planar structure to which the electronic device is to be connected to. As another example, second element 140 could be embodied as a flat surface with self-adhesive tape to attach to a wall or planar surface, and/or it may include holes in it to secure with screws to a wall, etc.

Further, second element 140 could take on many forms such as a flat piece that affixes to a wall or horizontal surface, embodied as a rivet on a golf bag or on soft goods materials like canvas covers, waterproof covers, etc. Second element 140 may also take the form of a belt clip to allow anyone to take what they want with them and use it as they desire. Examples include keys on a key ring or a bottle opener for bar tenders for example. Moreover, second element 140 may be attached to or otherwise on the exterior of a work vehicle in order to provide easy access to tools.

As shown, the dongle 110 includes a first magnet 115, and a bore 131 within the receiver assembly 130 includes a second magnet 135. The first magnet 115 is exposed in the plug-shaped portion 111 of the dongle 110, with the plug-shaped portion 111 having an external surface 112. The second magnet 135 is exposed on and/or forms the rear interior facing wall surface within the bore 131 of the receiver assembly 130.

To connect the first and second elements 120, 140, the first and second magnets 115, 135 come into proximal facing relation without touching one another and with maximum magnetic attraction, as the plug-shaped portion 111 of the dongle 110 is inserted into the bore 131 of the receiver assembly 130. Specifically, the first magnet 115 is captured or attracted by the second magnet 135 without the user having to initiate an inserting action. This principle of magnetic suction is used to make a variety of devices, from doorbells (in which an iron rod is sucked into a coil to strike a chime) to pinball machines (in which current goes through a coil, sucking in a rod that is attached to the flipper) to the starter switch on your car.

Friction induced between interior wall portions 132 of the bore 131 in the receiver assembly 130 and contact therewith of the external surface 112 of the plug-shaped portion 111 of the dongle 110 facilitates securement of the dongle 110 to receiver assembly 130 and hence the first element 120 to the second element 140. Friction plays a part to facilitating securement of dongle 110 within receiver assembly 130 due to the orientation of the dongle 110 being in the horizontal plane relative to the bore 131 of the receiver assembly 130, which also is oriented in the horizontal plane.

Figure 8:
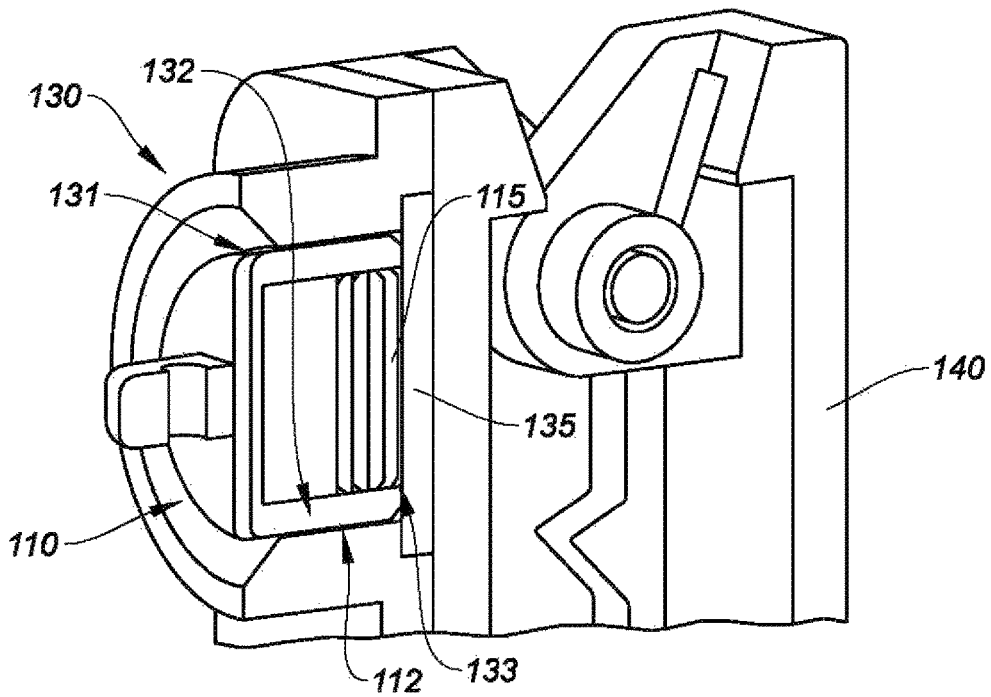
FIG. 8 is a cross-sectional view of the connector structure in FIG. 5 to further illustrate connective relationship between the first and second modules so as to releasably connect the first element with the second element

Referring now to FIG. 8, a clearance spacing 133 or width between faces of the two magnets 115, 135 within the bore 131 of the receiver assembly 130 is adjustable to vary the pull force of magnetic attraction. In an example, this clearance spacing 133 between faces of the two magnets 115, 135 may be in a range of about 1 to 3 millimeters wide, although this example range is only one possible construction for connector structure 100; a distance less than 1 mm or greater than 3 mm is also foreseeable based on the desired pull force present between the opposed faces of the two magnets 115, 135.

In order to remove the dongle 110 out of the bore 131 of the receiver assembly 130 by overcoming the pull force of magnetic attraction between the facing magnets 115, 135, dongle 110 must be completely concentric within the bore 131 of the receiver assembly 130 so that it may be pulled directly out of the bore 131 for removal therefrom. Additionally, the friction present between the external surfaces 112 of dongle 110 and the interior wall portion 132 in bore 131 of the receiver assembly 130 prevents a user from applying an offset, angled, or indirect pull force on the dongle 110 in an effort to remove it from the bore 131 of receiver assembly 130.

A magnet is any object that has a magnetic field. It attracts ferrous objects like pieces of iron, steel, nickel and cobalt. In the early days, the Greeks observed that the naturally occurring "'lodestone" attracted iron pieces. Today, magnets are made artificially in various shapes and sizes depending on their use.

Pull force is the force required to pull a magnet free from a flat steel plate using a force that is perpendicular to the surface. It is the limit of the holding power of a magnet. Gaussmeters are used to measure the magnetic field density at the surface of the magnet. This is referred to as the surface field and is measured in Gauss (or Tesla). Pull force testers are used to test the holding force (pull force) of a magnet that is in contact with a flat steel plate. Pull forces are measured in pounds (or kilograms).

Typically magnets may be tested in a few different configurations. One test measures the maximum pull force in pounds (or kilograms) generated between a single magnet and a thick, ground, flat steel plate. Another test measures the maximum pull force generated with a single magnet sandwiched between two thick, ground, flat steel plates. A third test, relevant to the example embodiments herein, measures maximum pull force generated on a magnet attracted to another magnet of the same type.

The calculated pull force values are normally determined from an average value for five samples of each magnet. A digital force gauge records the tensile force on the magnet. The plates are pulled apart until the magnet disconnects from one of the plates. The peak value is recorded as the "pull force".

Neodymium iron boron (NdFeB, also known as Neo, NIB or super magnets) is the strongest commercial magnet material currently produced. Neodymium magnets are fabricated in many different shapes and sizes including discs, rings, and blocks, or custom, made-to-order neodymium magnets. Neodymium magnets typically have poor resistance to corrosion and they can also corrode from the inside out if proper pre-treatment processes are not followed. Thus, oftentimes multi-layer nickel-copper-nickel plating is applied. Magnets 115 and 135 may be embodied as NdFeB disc magnets which may include, but are not be limited to, neodymium magnets Grade N42, 0.25" diameter×0.125" thick with a pull force between 2.1 and 4.9 pounds. In one example, such magnets are commercially fabricated by APPLIED MAGNETS™ of Plano, Tex.

Samarium cobalt (SmCo) magnets, also known as rare earth magnets, typically are regarded as offering the best value when comparing performance and size in high temperature or adverse environments. SmCo magnets are higher in cost, but magnetically very strong and typically allow for dimensional reductions. SmCo rare earth magnets are substantially resistant to corrosion and do not normally require any surface treatment. These magnets can operate at temperatures up to 500° F. (260° C.), making these rare earth magnets ideal for high heat applications. In another example, magnets 115 and 135 may be embodied as rare earth disc magnets including but not be limited to 0.25" diameter×0.125" thick samarium cobalt $Sm_2Co_{17}$ disc magnets with a pull force of at least 1.6 pounds. These rare earth magnets are also commercially fabricated by APPLIED MAGNETS.

Alnico magnets are largely comprised of aluminum (Al), nickel (Ni), and cobalt (Co), aluminum and other trace amounts of elements such as copper (Cu) and titanium (Ti) to tailor the alloy's magnetic and mechanical properties. Introduced in the 1930's, alnico magnets exhibit excellent temperature stability, high residual induction, relatively high energies and strong resistance to corrosion. These magnets are widely used for motor, sensor, separator, loudspeaker, electronic ignition systems, generators, vending machines, hand tools, magnetic reed switches, volt-amp meters, medical instruments and other magnetic applications. In another example, magnets 115 and 135 may be embodied by alnico magnets exhibiting a pull force of between about 2.0 and 4.9 pounds.

Accordingly, in one example construction, connector structure 100 may be configured with first and second magnets 115, 135 exhibiting a pull force of less than five (5) pounds. In another example construction, connector structure 100 may be configured with first and second magnets 115, 135 exhibiting a pull force of in a range of between about 1.6 to 4.9 pounds. In yet a further example construction, connector structure 100 may be configured with each of the first and second magnets 115, 135 exhibiting a pull force in a range of between about 2.0 to 3.0 pounds.

FIGS. 9-14 are directed to a mechanical-magnetic connecting structure according to another example embodiment. The mechanical-magnetic connecting structure 200 described in these figures is somewhat similar to the embodiment shown in FIGS. 5-8 and may be fabricated and/or constructed from like materials. Accordingly, for sake of brevity only the differences are discussed in detail hereafter.

Figure 9:
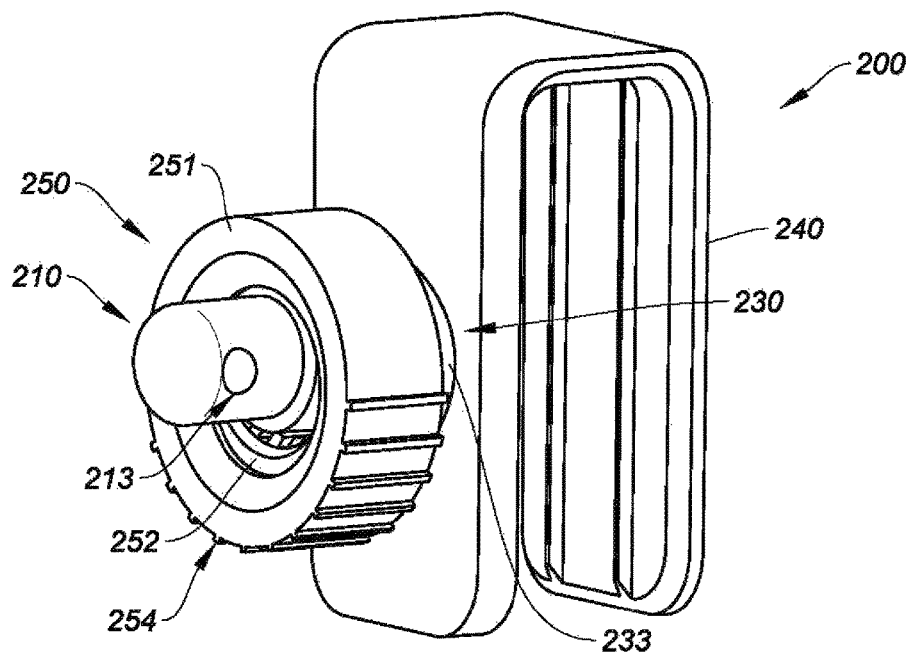
FIG. 9 is a perspective view of a mechanical-magnetic connecting structure according to another example embodiment.
Figure 10:
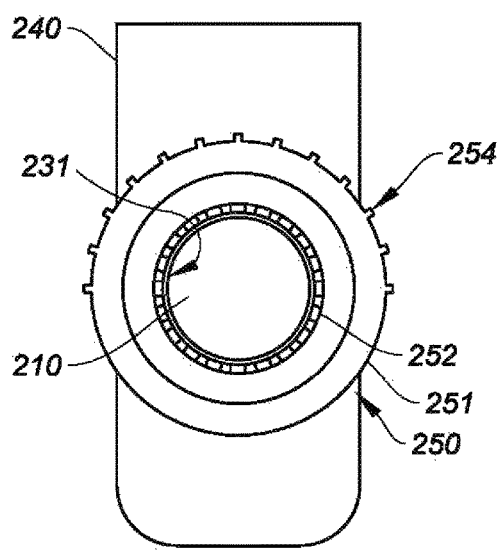
FIG. 10 is a front view of the structure from FIG. 9 in an open configuration where the dongle is concentric within a bore of the receiver assembly.
Figure 11:
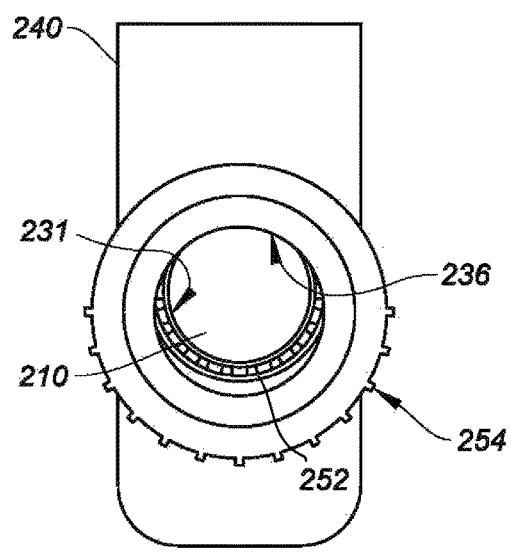
FIG. 11 is a front view of the structure from FIG. 9 in a closed configuration where the dongle is off center relative to the bore of the receiver assembly.

Referring to FIGS. 9-11, there is shown a connector structure 200 for releasably connecting a first element (not shown) with a second element 240. Similar to the first embodiment, the first element may be embodied by any kind or type of article to be connected to another for any type of usage, or be attachable to any horizontal surface for any purpose or function. A previous example used herein was to a golf accessory or electronic device, another article for that matter and the like. The second element 240 may also be embodied by any kind or type of article to be connected to another for any type of usage, or be attachable to any horizontal surface for any purpose or function. A previous example used herein was a clip attachable to a golf bag, or any planar structure to be coupled to the electronic device, another article for that matter and the like.

In the connector structure 200, there is shown a dongle 210 configured to be attachable to the first element, a receiver assembly (generally shown by element 230) attachable to the second element 240 for receiving the dongle 210 therein, and a rotating knob assembly (generally shown by element 250) attached to the receiver assembly 230 for locking or unlocking the dongle 210 therein. The dongle 210 has an external curved surface 211 and includes an exposed first magnet 215 (not shown but exposed on a front facing surface 212 of dongle 210), and the receiver assembly 230 includes a bore 231 with a second magnet 235 (not shown in FIGS. 9-11) forming a rear interior facing wall surface thereof. A surface of part of the receiver assembly 230 includes one or more visual indicia (illustrated as ribs 254) thereon to indicate whether it is in an open or closed position to a user.

Figure 12:
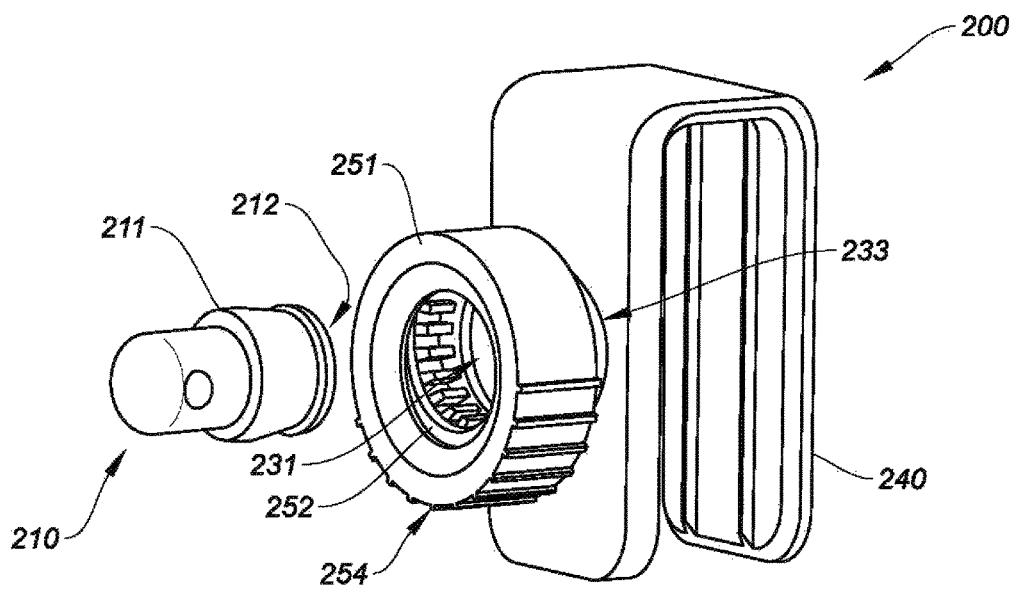
FIG. 12 is a perspective view of the structure shown in FIG. 9 with the dongle removed so as to show additional details of the rotating knob assembly.
Figure 13:
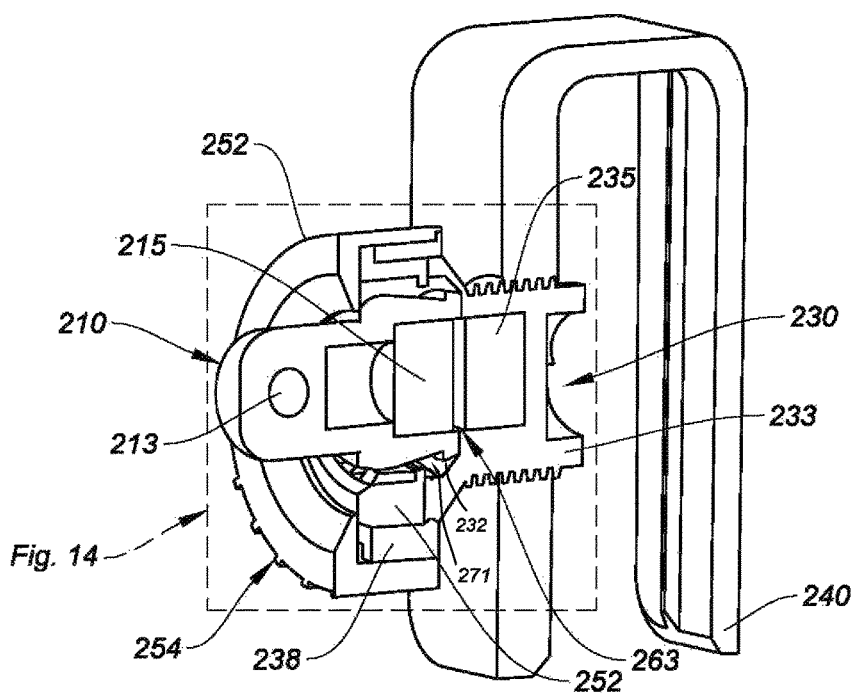
FIG. 13 is a cross-sectional view of the connector structure in FIG. 9 to further illustrate connective relationships between the dongle and receiver assembly so as to releasably connect first and second elements.
Figure 14:
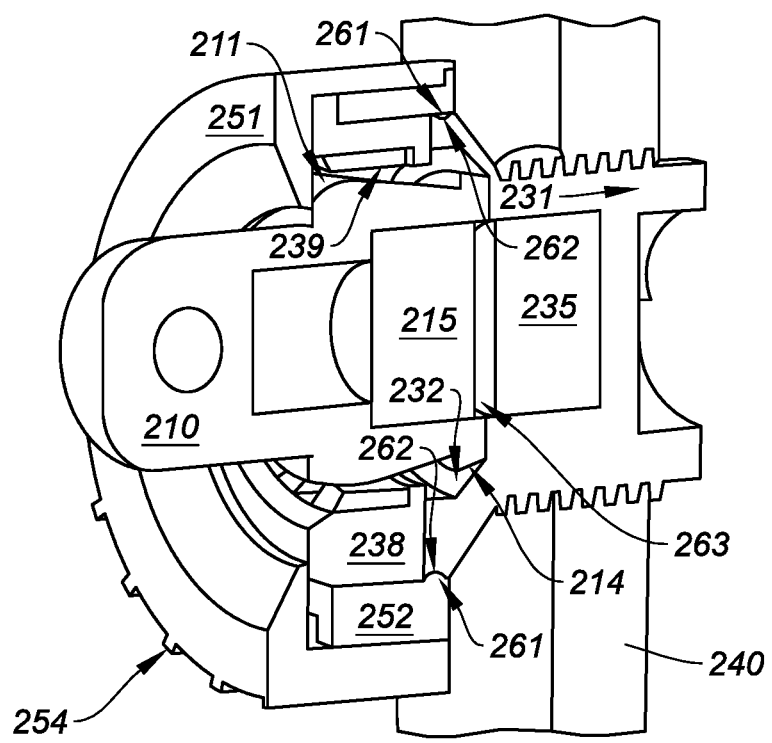
FIG. 14 is an enlarged view of the dotted line box section of FIG. 13 to illustrate more detailed connective relationships in the dongle to receiver assembly interface.

FIG. 12 is a perspective view of the structure 200 shown in FIG. 9 with the dongle 210 removed, so as to show additional details of the rotating knob assembly 250; FIG. 13 is a cross-sectional view of the connector structure 200 in FIG. 9 to further illustrate connective relationships between the dongle 210 and receiver assembly 230 so as to releasably connect first and second elements; and FIG. 14 is an enlarged view of the dotted line box section of FIG. 13 to illustrate more detailed connective relationships in the dongle 210 to receiver assembly 230 interface. In operation, the first and second magnets 215, 235 are brought into proximal facing relation as the dongle 210 is inserted into the bore 231 of the receiver assembly 230. Unlike the previous embodiment, connector structure 200 includes a dynamic lock. If an item (i.e., first element) is heavy enough, it will purposely tilt the portion of dongle 210 that is inserted inside the receiver assembly 230 and engage an interior dynamic lock to be described in more detail hereafter. If a light first element is attached to the dongle 210, the dynamic lock will not engage. There could be light objects that are just heavy enough to create a whip motion that increases the pull weight on the dongle 210 and would thus engage the dynamic lock. Of note, opposed facing surfaces of the first and second magnets 215, 235 do not come into contact with one another within the bore 231 of the receiver assembly 230.

As best shown in FIG. 14, the dynamic lock mechanism for connector structure 200 in an example is provided in part by the engagement of the curved external surface 211 of dongle 210 with an interior facing wall surface 239 of a collar 238. Since the external surface 211 is curved and not straight, it acts as a rocker to provide forgiveness or a "give and flex" action to the portion of dongle 210 (namely the curved external surface 211 and the circular ridged end 214, as shown) that is inserted through collar 238 into the bore 231 of the receiver assembly 230. By offering this flex ability, circular ridged end 214 can essentially move and cant within a circumferential channel 271 provided between the rear wall of collar 238 and a front ledge wall 232 of receiver body 233. The capture of the ridged end 214 in the channel 271 will prevent the dongle 210 from inadvertently popping out of the receiver assembly 230 due to the weight or pull force applied to a first element 210 attached thereto.

The connector structure 200 has an open and closed position. The visual indicia 254 on the rotating knob assembly 250 helps the user to see whether or not the dongle 210 is locked in the receiver assembly 230, or unlocked so that it may be removed. As shown in FIGS. 10 through 12, the knob assembly 250 includes a rotatable external ring 251 that is attached to an internal ring 252. The external ring 251 has an inner wall portion 236 and with the internal ring 252 forms an opening with a depth; this can best be seen in the perspective of FIG. 12. This opening is either completely aligned with that of the bore 231 or is not, depending on the position of the external ring 251.

In continued reference to FIGS. 10-12, rotation of the external ring 251 in a direction of closing causes the external ring 251 to rotate "out of round" as compared to the internal ring 252. Accordingly, the wall portion 236 actually serves as a blocker so that the dongle 210 cannot be removed from the bore 231. In one example, when the visual indicia 254 are oriented in an upper or top position on the connector structure 200, i.e., when the external ring 251 has been rotated in an opening direction from a first to a second position, the dongle 210 is completely concentric within the bore 231 of the receiver assembly 230, and no portion of the wall portion 236 of the external ring 251 blocks the path of removal of the dongle 210 out of bore 231. In other words, the opening formed by the external/internal rings 251, 252, the dongle 210 itself, and bore 231 of receiver assembly 230 are in complete alignment. As such, the dongle 210 may be pulled directly straight out for removal. This is illustrated best by FIG. 10, where the dongle 210 is completely concentric and in alignment with the bore 231.

On the contrary, when the external ring 251 is rotated in the opposite, closing direction from the second back to the first position, the opening in the external/internal rings 251, 252 is no longer in alignment with the bore 231, as the wall portion 236 of the external ring 251 has become out of round and serves to block removal of the dongle 210 from the bore 231 and through the opening of the rings 251/252. This is clearly shown in FIG. 11, as dongle 210 is no longer concentric and cannot be removed from the bore 231 of the receiver assembly 230, as it is essentially blocked by the wall portion 236 of the external ring 251. As such, in this condition the visual indicia 254 are oriented in a lower or bottom position on the connector structure 200.

Similar to the first embodiment, the magnets 215, 235 may be composed of NdFeB, Alnico or rare earth metals such as SmCo. In one example construction, connector structure 200 may be configured with first and second magnets 215, 235 exhibiting a pull force of less than five (5) pounds. In another example construction, connector structure 200 may be configured with first and second magnets 215, 235 exhibiting a pull force in a range of between about 1.6 to 4.9 pounds. In yet a further example construction, connector structure 200 may be configured with first and second magnets 215, 235 exhibiting a pull force in a range of between about 2.0 to 3.0 pounds.

Unlike the first embodiment, the connector structure 200 has a locking arrangement for securing the dongle 210 within the bore 231 of the receiver assembly 230. In general, the rotating knob assembly 250 is rotatable in a counter-clockwise direction from a first position to a second position to prevent removal of the dongle 210 from the receiver assembly 230. The rotating knob assembly 250 is also rotatable in a clockwise direction from a first position to a second position to permit removal of the dongle 210 from the receiver assembly 230 by a user overcoming the pull force present between the two magnets 215, 235. The dongle 210 is removable from the bore 231 only if it is completely concentric within the bore 231 and the rotating knob assembly 250 has been rotated clockwise.

Referring once again to FIGS. 12-14, the receiver assembly 230 includes the receiver body 233 with bore 231 therein for receiving the dongle 210 and a threaded external surface 237 for attachment to the second element 240. Receiver assembly 230 also includes the collar 238 integrally formed with the receiver body 233. The rotating knob assembly 250 includes the external ring 251, which may be made of a rubber material to provide a tactile enhancement and which is adapted to be rotatable between an open and closed position to unlock or lock the dongle 210 within the bore 231. The external ring 251 includes the visual indicia 254 thereon to aid the user in determining whether or not the dongle 210 is locked in the receiver assembly 230, or unlocked so that it may be removed. The rotating knob assembly 250 further includes an internal ring 252 integrally formed with the external ring 251. The internal ring 252 is connected to the collar 238 so as to secure the external ring 251 to the receiver body 233.

As best seen in FIG. 14, the first magnet 215 is captured within dongle 210 and the second magnet 235 is captured within the bore 231 of the receiver body 233. The rotating knob assembly 250 is held attached to the receiver body 233 by the engagement of a plurality of spaced detents 261 formed on internal ring 252, which in turn are captured by corresponding ramps 262 formed in receiver body 233, thereby securing rotating knob assembly 250 to the fixed receiver assembly 230 while allowing 180° rotational travel of the rotating knob assembly 250.

Additionally, a clearance spacing 263 or width between faces of the two magnets 215, 235 within the bore 231 is adjustable to vary the pull force required for magnetic attraction between the two magnets 215, 235. In an example, this clearance spacing 233 may be in a range of about 1 to 3 millimeters wide, although the example embodiments are not so limited to this example clearance spacing; the spacing may by less than 1 mm or greater than 3 mm wide.

Figure 15:
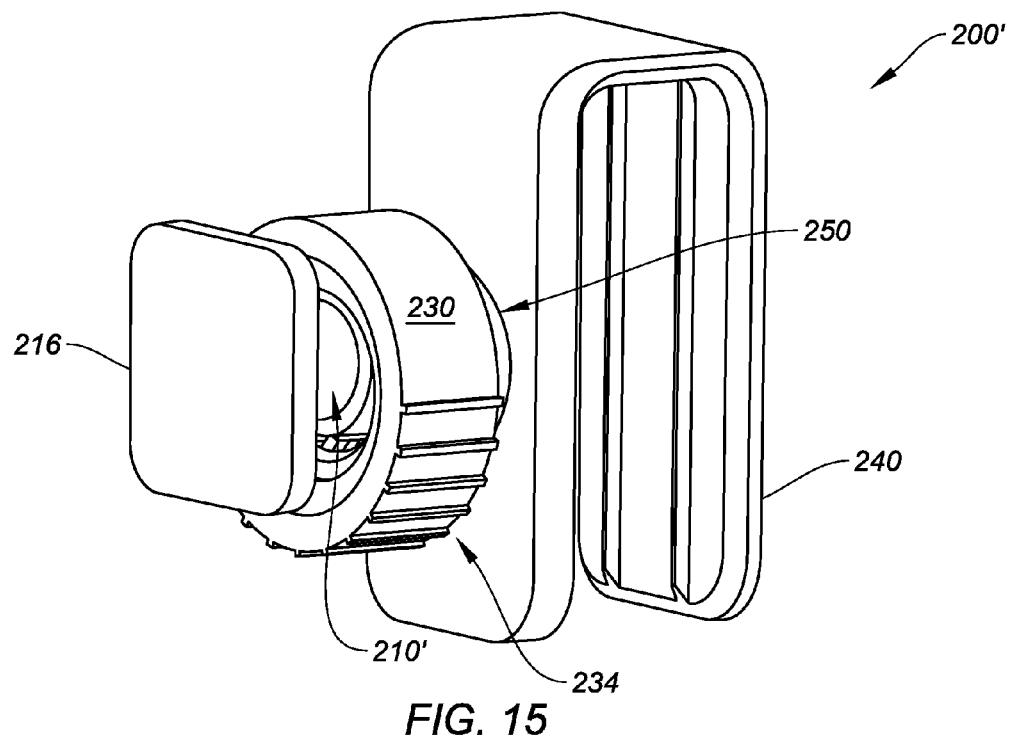
FIG. 15 is a perspective view of a mechanical-magnetic connecting structure according to another example embodiment.
Figure 16:
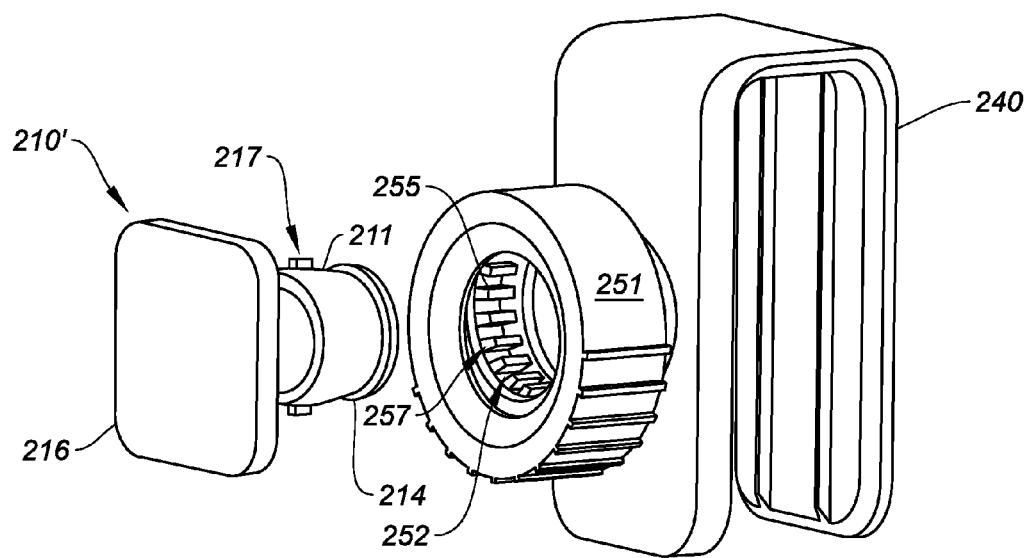
FIG. 16 is a perspective view of the structure shown in FIG. 15 with the dongle removed so as to show additional details of the rotating knob assembly.
Figure 17:
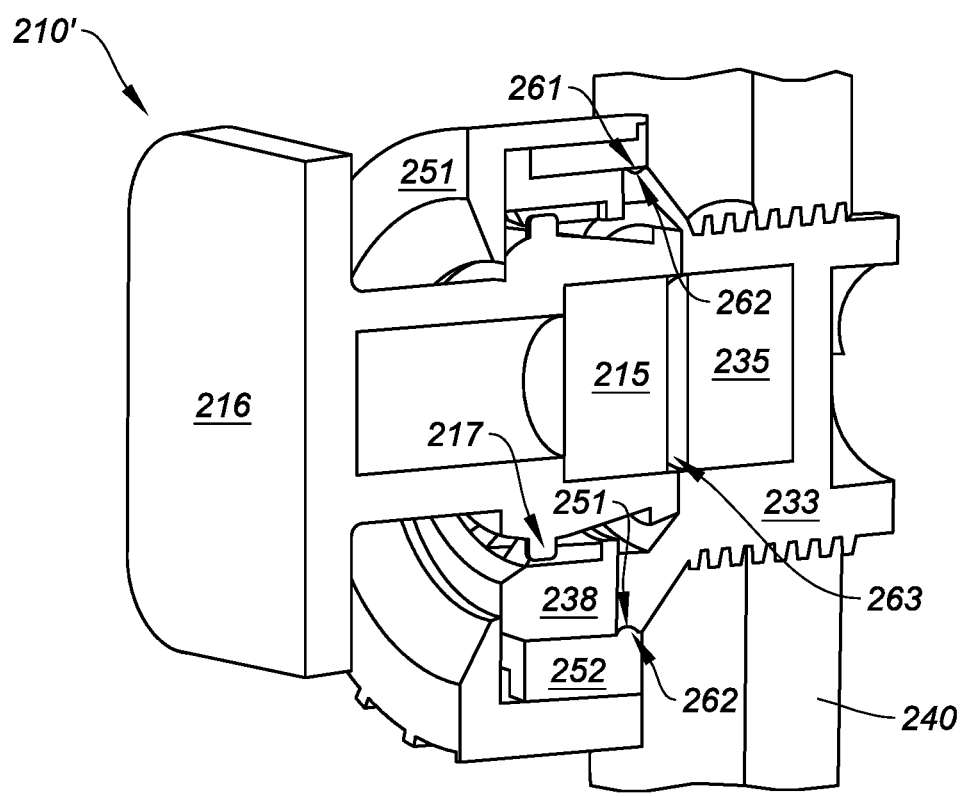
FIG. 17 is an enlarged view of the dongle to receiver assembly interface to illustrate more detailed connective relationships therein.
Figure 18:
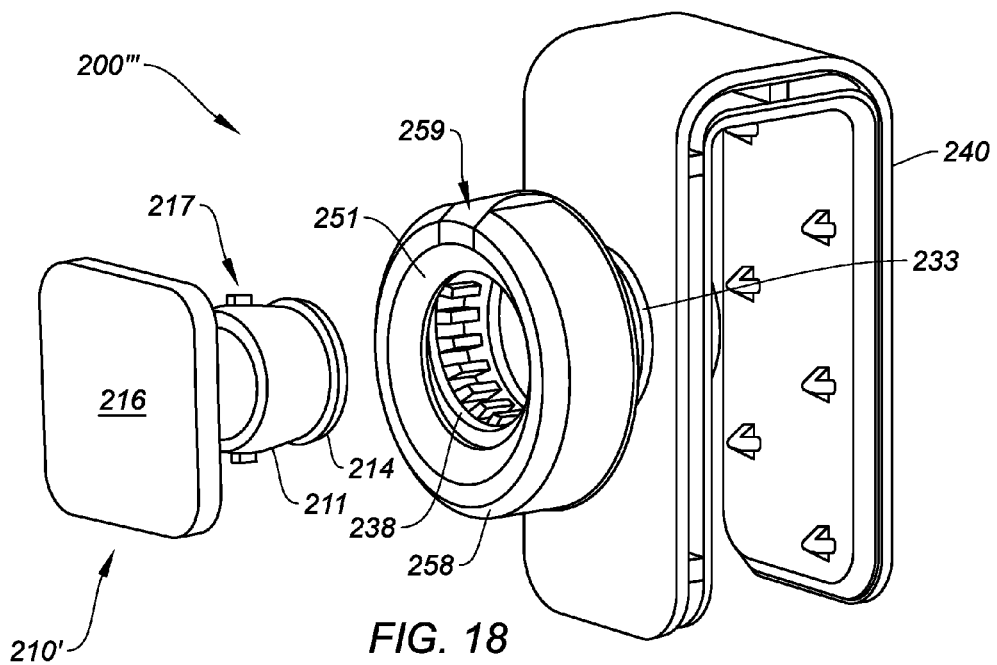
FIG. 18 is a perspective view of a mechanical-magnetic connecting structure according to another example embodiment, with the dongle separated from the connector structure.
Figure 19:
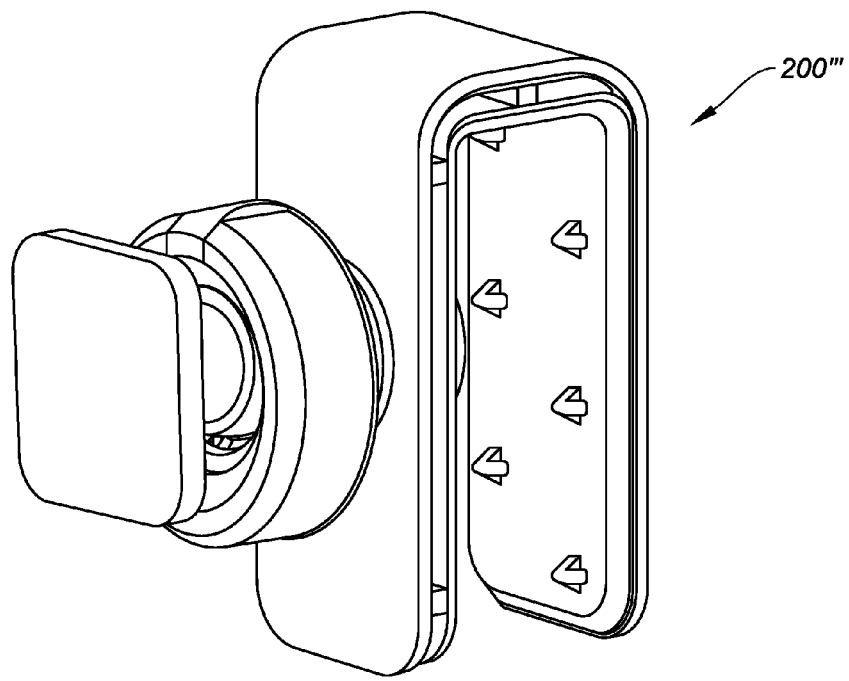
FIG. 19 is a perspective view of the mechanical-magnetic connecting structure of FIG. 18 with the dongle engaged and secured therein.
Figure 20:
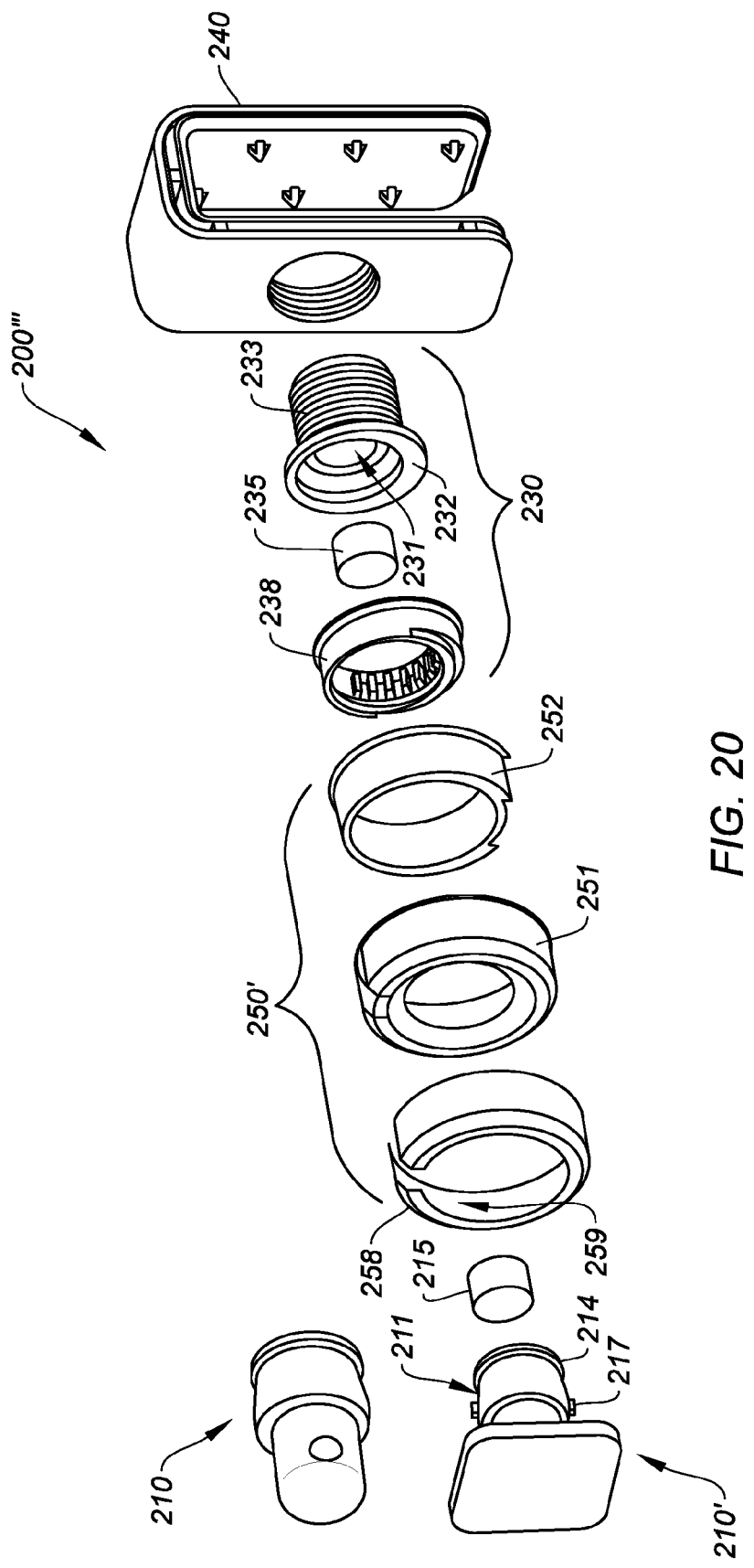
FIG. 20 is an exploded parts view of the mechanical-magnetic connecting structure of FIG. 18.

FIGS. 15-17 are directed to a mechanical-magnetic connecting structure according to another example embodiment. The mechanical-magnetic connecting structure 200' described in these figures is somewhat similar to the embodiments shown in FIGS. 5-14 and may be fabricated and/or constructed from like materials. As this embodiment is similar in many respects to the previous configurations shown and described in FIGS. 5-14, only the differences are discussed in detail.

As best seen in FIG. 16, an inner circumferential surface of collar 238 includes or comprises a plurality of spaced elongate ridge elements 255 which define a plurality of troughs 257 between adjacent ridge elements 255. Dongle 210' also includes a pair of teeth or bucks 217 formed 180° apart from each other on the curved surface 211 portion of dongle 210'. These bucks 217 engage into corresponding troughs 257 within collar 238 to prevent the dongle 210' from turning freely inside the receiver assembly 230.

Dongle 210', which includes a flat geometrically-shaped tab end 216 adapted for connection to an external object (i.e., first element) may be attached to or integrally formed with part of different structure(s), such as part of a universal smart phone holder, for example. The primary difference in dongle 210' as compared to those in the previous embodiments is the inclusion of the bucks 217. The dongles 110, 210 of the previous embodiments may also be attached to or be integrally part of something larger, but with an intention that they may be adapted to spin freely under the weight of the object attached thereto, whereas dongle 210' does not.

FIGS. 18-24 are directed to a mechanical-magnetic connecting structure according to another example embodiment. The mechanical-magnetic connecting structure 200''' described in these figures is somewhat similar to the embodiments shown in FIGS. 5-17 and may be fabricated and/or constructed from like materials. As this embodiment is similar in many respects to the previous configurations shown and described in FIGS. 5-17, only the differences are discussed in detail.

Referring to FIGS. 18-24, this structure 200' may include either dongle 210/210' configuration. One difference in this embodiment is a differently configured rotating knob assembly 250'. In addition to the external and internal rings 251, 252, which may be fused or otherwise integrally molded together to form a single, integral member, a clear rubberized overmold or cover 258 is provided so as to sheath the external ring 251. In one example, overmold 258 may be fused to external ring 251 by sonic welding. Overmold 258 provides a tactile enhancement for the user in that it offers a studier and/or more resilient gripping surface to rotate the rings 251/252 in order to lock and/or unlock connector structure 200''', so that one of dongles 210/210' may be secured/removed.

Another variation from previous embodiments is a differently configured indicator 254; essentially this is provided by a gap or "window" 259 formed in the clear rubberized overmold 258. When visible at the top end of the rotating knob assembly 250', the rotating knob assembly 250' has been turned clockwise such that structure 200''' is unlocked for insertion of a dongle 210/210' therein. Conversely, when assembly 250' has been rotated 180° counter-clockwise, window 259 is not visible, indicating that the dongle 210/210' is locked and secured within receiver assembly 230.

Figure 21:
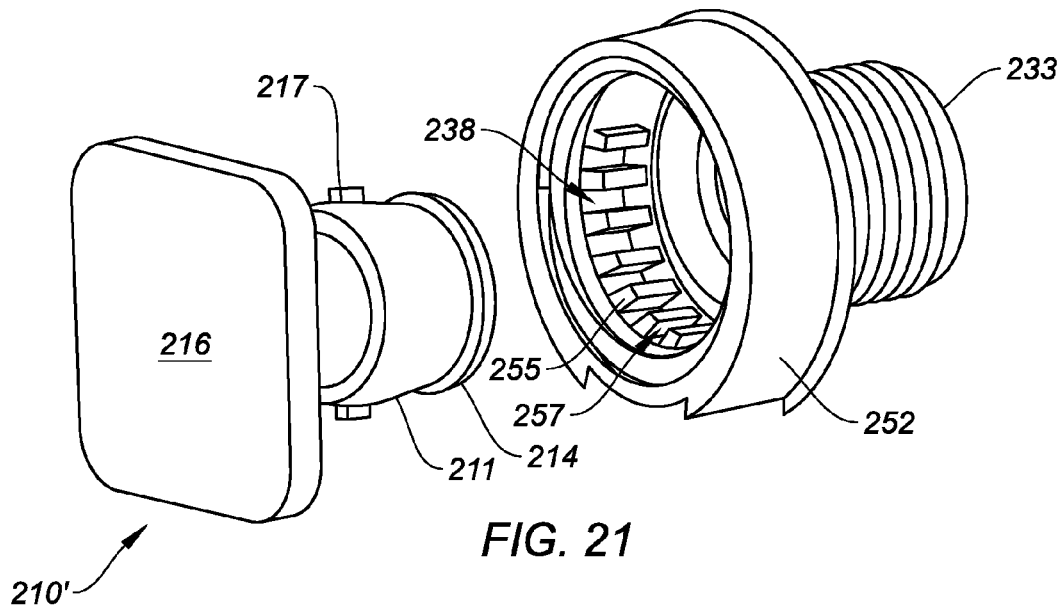
FIG. 21 is a perspective view with various parts removed to illustrate connective relationships between the dongle and receiver assembly.
Figure 22:
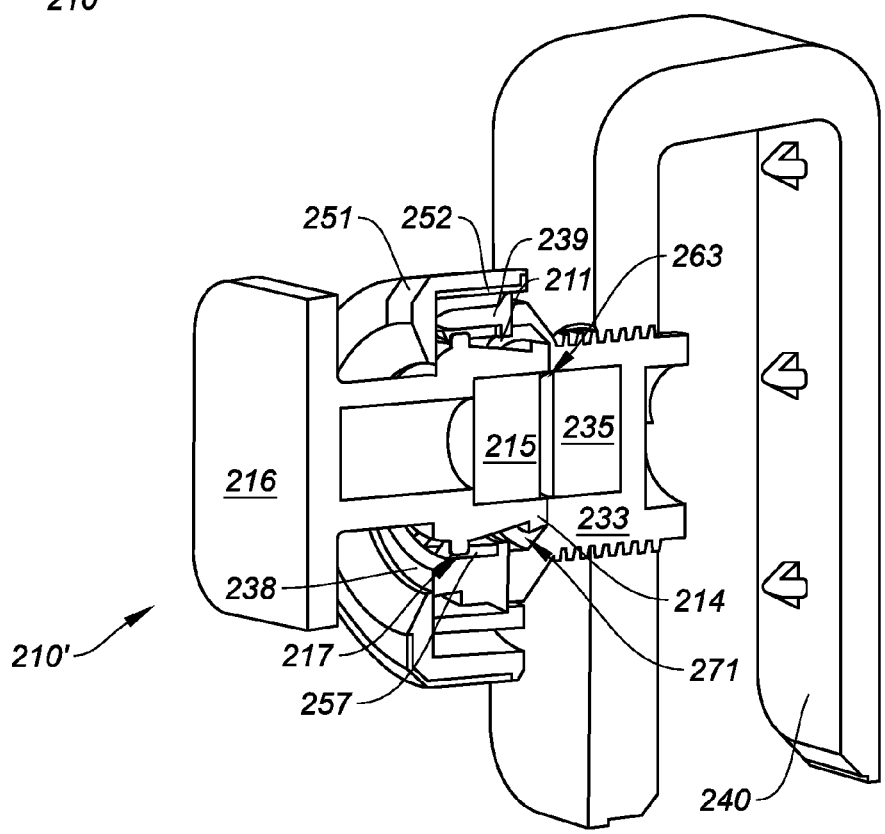
FIG. 22 is a cross-sectional view taken of the structure shown in FIG. 18 to illustrate various constituent components thereof in more detail.
Figure 24:
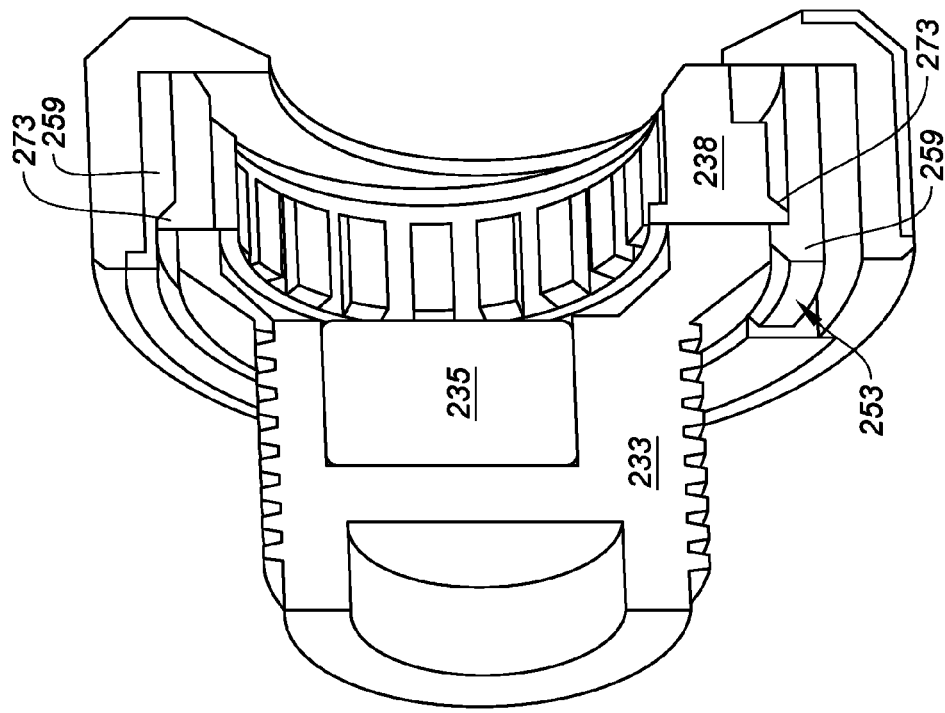
FIG. 24 a cross-sectional view taken of the structure shown in FIG. 18 to illustrate connective relationship between the internal ring of the rotating knob assembly and collar of the receiver assembly in more detail.
Figure 23:
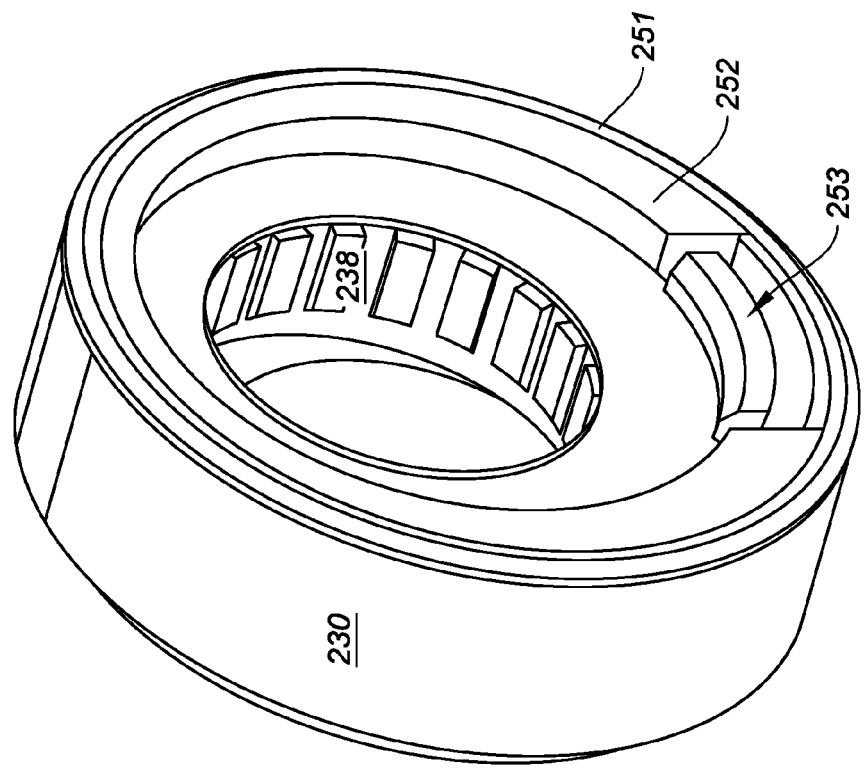
FIG. 23 a perspective view with various parts removed to illustrate connective relationships between the rotating knob assembly and collar of the receiver assembly in more detail.

With reference to FIGS. 21 and 22, connector structure 200''' also includes the aforementioned dynamic lock mechanism, whereby curved surface 211 of dongle 210' engages the interior facing wall surface 239 of collar 238, thereby serving as a rocker to provide a give and flex action to the portion of dongle 210 that is inserted through collar 238 into the receiver assembly 230. This flex ability enables the circular ridged end 214 of dongle 210' to have some free play and movement within a circumferential channel 271 present between the rear wall of collar 238 and the front ledge wall 232 of receiver body 233. This arrangement thus prevents the dongle 210' from inadvertently popping out of the receiver assembly 230 due to the weight or pull force applied on a first element or external object attached thereto.

Similar to previously described embodiments, the inner circumferential wall surface 239 of collar 238 includes the spaced elongate ridge elements 255 thereon defining troughs 257 therebetween, which engage bucks 217 as the dongle 210' is inserted within the collar 238 of receiver assembly 230, thus preventing dongle 210' from turning freely therein. Also, dongle 210', having its flat geometrically-shaped tab end 216 adapted for connection to an external object, may form part of a universal smart phone holder as previously noted.

Another variation is in the structure of internal ring 252. Ring 252 includes a pair of truncated sections 253 that are 180° apart, each section 253 further including a circular ramp wall 259 that flexes up and over the collar rim 273 to snap-fit secure the rotating knob assembly 250' to the receiver assembly 230, while still allowing free rotation thereof relative to the fixed receiver assembly 230. Essentially, this provides a stop element on internal ring 252 which bumps against the collar 238, generating a tactile click-click sound. This concept thus differs from that described in FIG. 14, where detents 261 formed on internal ring 252 are captured by corresponding ramps 262 formed in receiver body 233 in order to secure rotating knob assembly 250 to the receiver assembly 230 while allowing 180° rotational travel of the rotating knob assembly 250.

The example embodiments having been described, it is apparent that such have many varied applications. For example, the example embodiments may be applicable but not limited to connection to various devices, structures and articles (e.g., second elements 140, 240) including but not limited to kitchen appliances, tools such as wrenches and screw drivers, keys on a belt, ring, or bottle opener, the exterior of a work vehicle, and the like.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A mechanical-magnetic connector structure for releasably connecting a first element with a second element, the connector structure comprising:
   a generally cylindrical first module having a length, a width, and an exterior side surface spanning substantially along the length between a bottom end of the first module and an upper end where the first module is attached to the first element, the first element representing a weighted load on the first module, the width of the first module and its exterior side surface being constant between the bottom end of the first module and the upper end where the first module attaches to the first element, and
   a generally cylindrical second module fixedly attached to the second element, the second module further comprised of a receiver body that is fixed to or integral with a surface that is perpendicular to the receiver and which serves as anchoring point for the connector structure to connect and remove the releasable first element to or from the fixed second element, the receiver body having a length, a width and an elongate internal bore having a length, width, and an interior wall surface, the bore length terminating at an interior rear face of the receiver, the bore adapted to receive the first module therein such that substantially the entire length of the exterior side surface of the first module is in contact with substantially the entire length of the interior wall surface within the bore so that substantial friction between the two surfaces can be created, the friction between contacting surfaces caused by the weighted first element on the first module, and friction between contacting surfaces also caused when any angled or perpendicular pull force is applied to the first module or to the first element attached thereto when substantially the entire length of the exterior side surface of the first module is within the bore, wherein
   the first module includes a first magnet exposed flush to a bottom surface of the first module and the second module includes a second magnet within the bore at the interior rear face of the receiver,
   the first and second magnets adapted to be brought into proximate, opposed facing relation with magnetic attraction as substantially the entire length of the exterior side surface of the first module is magnetically sucked into the bore, wherein
   only the magnetic attraction between the opposed facing spaced magnets, the friction that is created between substantially the entire length of the interior wall surface of the bore and substantially the entire length of the exterior side surface of the first module within the receiver body due to the loading imparted on the first module by the first element, and friction, when the first module is within the bore of the second module, that is created between contacting surfaces between and along substantially the entire length of the interior surface of the bore and substantially the entire length of the exterior side surface of the first module within the receiver body when any angled or perpendicular pull force is applied to the first module or to the first element attached thereto serve to secure the first module within the receiver body so that the first module is unable to be removed therefrom, the first module removable only if it is pulled directly straight out from the bore of the receiver so as to overcome the magnetic attraction and friction between substantially the entire length of the interior wall surface of the bore and substantially the entire length of the exterior side surface of the first module that was created due to loading by the first element on the first module.

2. The connector structure of claim 1, wherein each of the first and second magnets exhibits a pull force of less than five (5) pounds.

3. The connector structure of claim 1, wherein each of the first and second magnets exhibits a pull force in a range of between about 1.6 to 4.9 pounds.

4. The connector structure of claim 1, wherein the first element is an electronic device and the second element is a planar structure.

5. The connector structure of claim 1, wherein the first element is a golf accessory and the second element is a clip adapted for attachment to a golf bag.

6. The connector structure of claim 1, wherein a clearance spacing or width exists between faces of the two magnets within the bore of the second module, the clearance spacing or width being in a range of about 1 to 3 millimeters.

7. The connector structure of claim 1, wherein the first module is required to be completely concentric within the bore of the second module to be removed therefrom, otherwise the first module cannot be removed from the bore.

8. The connector structure of claim 1, further comprising a dynamic lock mechanism which permits articulating movement of the first module within the bore of the second module, with the first module attached to its first element, while the first module remains locked and secured within the bore.

9. A mechanical-magnetic connector structure for releasably connecting a first element with a second element, the connector structure comprising:
   a dongle attached to the first element,
   a receiver assembly attached to the second element and having a bore for receiving the dongle therein, and
   a rotating knob assembly attached to the receiver assembly and rotatable between an open and closed position to unlock or lock the dongle within the bore, wherein with the rotating knob assembly rotated to the closed position, a wall portion of the knob assembly blocks removal of the dongle out of the bore, such that any offset, angled, or indirect pull force exerted by the user on the dongle in an effort to remove it from the bore will not remove the dongle, the dongle being removable out of the bore only upon the rotating knob assembly having been rotated to the open position, permitting a user to overcome pull forces between the magnets as the dongle is removed directly straight out of the bore.

10. The connector structure of claim 9, wherein
the dongle has external surfaces and includes an exposed first magnet, and
the receiver assembly includes a second magnet forming a rear interior facing wall surface within the bore thereof.

11. The connector structure of claim 10, wherein
the first and second magnets are brought into proximal facing relation as the dongle is inserted into the bore, and
friction between interior wall portions of the receiver assembly and external surfaces of the dongle facilitates securement of the dongle within the receiver assembly.

12. The connector structure of claim 9, wherein the first and second magnets do not contact one another within the bore of the receiver assembly.

13. The connector structure of claim 9, wherein each of the first and second magnets exhibits a pull force of less than five (5) pounds.

14. The connector structure of claim 9, wherein each of the first and second magnets exhibits a pull force in a range of between about 1.6 to 4.9 pounds.

15. The connector structure of claim 9, wherein each of the first and second magnets exhibits a pull force in a range of between about 2.0 to 3.0 pounds.

16. The connector structure of claim 9, wherein the rotating knob assembly includes an external ring adapted to be rotatable to the closed position, the external ring including the wall portion which blocks the bore in order to prevent removal of the dongle from the receiver assembly.

17. The connector structure of claim 9, wherein the external ring is rotatable to the open position in order to permit removal of the dongle from the bore of the receiver assembly.

18. The connector structure of claim 9, wherein the receiver assembly includes:
a receiver body with first and second ends and with a threaded portion formed on its external surface at the second end for attachment to the second element, the receiver body having the bore therein, and
a collar integrally formed with the receiver body at the first end thereof.

19. The connector structure of claim 18, wherein the rotating knob assembly includes:
a external ring rotatable between the open and closed positions to unlock or lock the dongle within the bore of the receiver body, the external ring including the wall portion that blocks removal of the dongle from the bore when the external ring is in the closed position, and
an internal ring integrally formed with the external ring, the internal ring connected to the collar so as to secure the external ring to the receiver body.

20. The connector structure of claim 19, wherein the external ring includes one or more visual indicia thereon to indicate whether it is in an open or closed position.

21. The connector structure of claim 9, further comprising a dynamic lock mechanism which permits articulating movement of the dongle within the bore of the receiver assembly, with the first module attached to its first element, while the dongle remains locked and secured within the bore.

22. A mechanical-magnetic connector structure for releasably connecting a first element to a second element that is fixed relative to the releasable first element, the connector structure comprising:
a dongle having a length, a width, and an exterior side surface spanning substantially along the length of the dongle between a bottom end thereof and an upper end of the dongle that is attached to the first element and under load due to weight of the first element attached thereto, the width of the dongle and its exterior side surface being constant between the bottom end of the dongle and the upper end where the dongle attaches to the first element, the dongle including a first magnet, and
a receiver assembly adapted to receive the dongle therein, the receiver assembly attached to the second element and including a second magnet therein, the receiver assembly further comprised of an elongate receiver portion fixed to or integral with a surface of the receiver assembly that is perpendicular to the receiver portion, the perpendicular surface serving as anchoring point for the connector structure between the first and second elements, the receiver portion having a length, a width and an elongate internal bore having a length, width, and an interior wall surface adapted to receive the first module therein such that substantially the entire length of the exterior side surface of the dongle is captured within substantially the entire length of the bore, wherein
the first and second magnets are adapted to be brought into proximate, opposed facing relation with magnetic attraction as the dongle is magnetically sucked into the bore so that substantial friction can be created between and along substantially the entire length of the exterior side surface of the dongle and along substantially the entire length of the interior wall surface of the bore to prevent removal of the dongle from the bore, the friction caused by the weight of the first element imparted on the dongle, with additional friction between substantially the entire lengths of the dongle exterior side surface and bore interior wall surface to prevent removal of the dongle from the bore being also caused when any angled or perpendicular pull force is applied to the dongle or to the first element attached thereto, where only a pull force applied so as to remove the dongle directly straight out from the bore will enable the dongle to be separated from the bore.

23. The connector structure of claim 22, further comprising a dynamic lock mechanism which permits articulating movement of the dongle within the bore of the receiver portion, with the dongle attached to its first element, while the dongle remains locked and secured within the bore.

* * * * *